Nov. 2, 1937.  W. F. AUGER  2,098,127
FROST SHIELD
Filed June 1, 1937
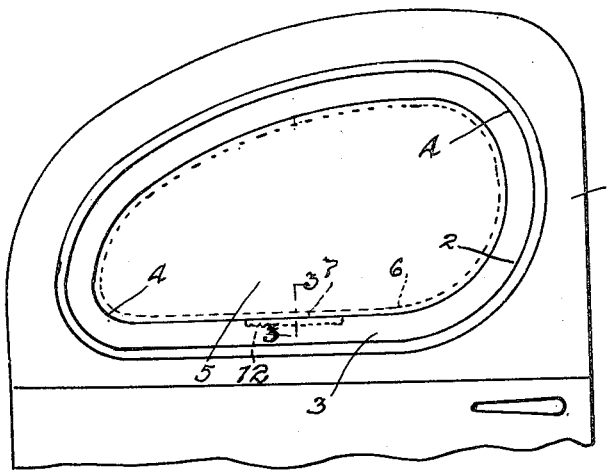
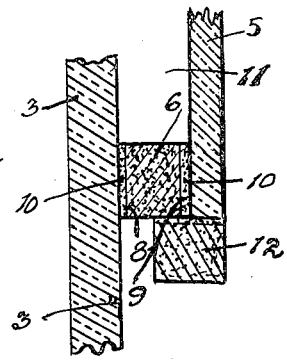
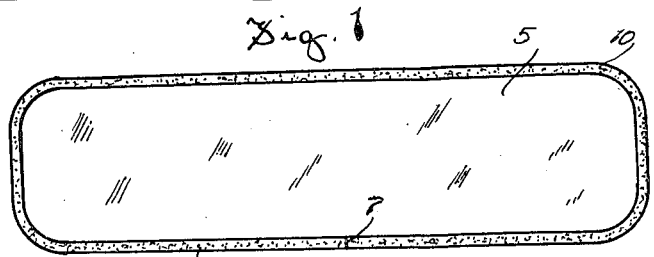
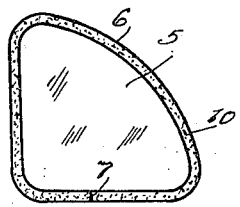
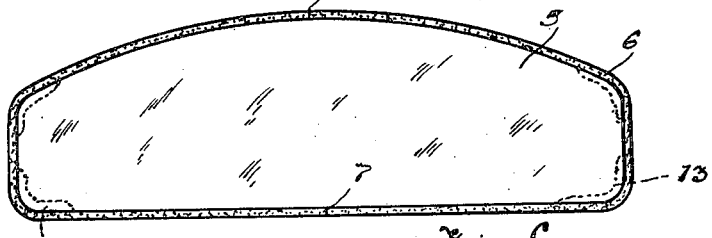
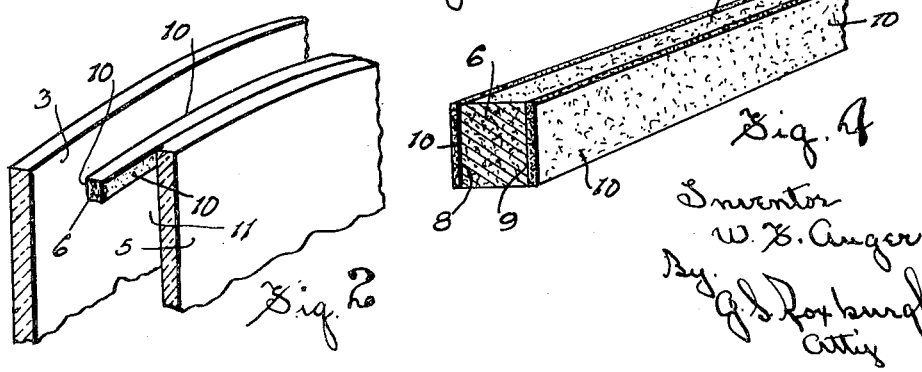
Inventor
W. F. Auger Patented Nov. 2, 1937

2,098,127

UNITED STATES PATENT OFFICE 2,098,127

FROST SHIELD

William F. Auger, Winnipeg, Manitoba, Canada

Application June 1, 1937, Serial No. 145,811
In Canada June 15, 1936

2 Claims. (Cl. 20—40.5)

The invention relates to frost shields, especially designed for use on automobile windows, and an object of the invention is to provide a frost shield which can be manufactured at comparatively small cost and can be applied on the various automobile windows with a minimum of labour.

A further object is to provide a frost shield which can be easily fashioned to conform to the various shaped window openings met with and will accordingly give a neat and pleasing appearance when in use.

A further object is to provide a frost shield having the spacing strip thereof made from a strip of sponge rubber, which gives effective cushioning and prevents breakage when doors are slammed, flexes readily to go around curves to conform to the contour of the window opening, and allows also of the use of a single strip for the entire spacer and thereby avoids undesirable joints, and which is also supplied on its opposite faces with normally non-tacky or non-adhesive coatings of adhesive material, thus avoiding the use of a protective strip of Holland cloth or such like material, and permitting when treated with gasoline of the effective sticking of the strip to the transparent plate of the frost shield and to the transparent plate of the window and this under all reasonable weather conditions.

With the above more important objects in view the invention consists essentially in the arrangement and construction of parts now described, reference being had to the accompanying drawing, in which:—

Fig. 1 is an interior view of the upper part of the foredoor of an automobile, fitted with my invention, and viewing it from the inner side.

Fig. 2 is an enlarged perspective view of a fragmentary portion of the door window plate and the frost shield.

Fig. 3 is an enlarged vertical sectional view at 3—3 Fig. 1.

Fig. 4 is a perspective view of part of the strip used.

Figs. 5, 6 and 7 are face views of various shaped frost shields and showing how the corners are rounded to conform to the rounded windows met with and how they can all be provided with the single spacing strip.

In the drawing like characters of reference indicate corresponding parts in the several figures.

At the present time, most of the newer automobile windows, are streamlined, so that they present rounded corners and on such account I have designed my frost shield so that when applied it will conform to the shape of the window opening and give a neat and pleasing effect.

In the present disclosure I have shown my frost shield as applied on the front door of an automobile, the said door being indicated generally by the reference numeral 1 and being provided with the streamlined window opening 2 containing the window 3. It will be observed that the window opening presents rounded corners 4 and it is most desirable that the frost shield conform to the contour of the window opening.

In constructing my shield, the plate of transparent material used, such as a glass plate 5, is cut as shown in Fig. 1 to conform to the contour of the window opening, in which it is to be used and I then secure to one of its faces, immediately adjoining the edge, a strip 6. This strip is made from sponge rubber and the length of the strip is such that, preferably only one strip is required to pass around the edge of the plate 5, the ends of the applied strip being butted as shown at 7. The sponge rubber strip flexes readily to conform to the shape of the edge of the plate and by using only one strip I avoid a plurality of joints, which is most desirable, as there is less danger of leakage to and from the dead air space between the plates and further reduce the labour of applying the strip to a minimum.

I may here say that I can at present obtain, commercially, sponge rubber strips of various lengths, such strips having their opposite faces 8 and 9 provided each with a coating 10 of normally non-tacky or non-adhesive material and here it is particularly to be noticed, that for commercial purposes it is not necessary to protect the applied coating by any covering, such as Holland cloth, as is customarily done where a normally tacky or a normally sticky adhesive is used.

Having obtained the so coated sponge rubber strips, I cut a strip to the length required for the window on which it is to be applied, as earlier explained and then I treat one of the coated surfaces of the strip with gasoline, by wiping it over with a gasoline dampened brush or rag. The gasoline immediately renders the coated surface tacky or sticky, and the sticky surface is stuck to the edge of the glass 5 by applying the strip and pressing it closely into contact glass. Only enough of the strip needs to be dampened at a time to insure expeditious work. The strip having been applied, the frost shield can then be placed on the window glass by treating the exposed remaining coated surface with gasoline to render such coating tacky or sticky and then pressing the latter tacky surface firmly into contact with the window glass, care being taken to properly center it in the window opening.

I might here mention that when the strip is being placed on the frost shield plate the two butted ends thereof are cemented together in order to insure against air leakage at such joint.

When the shield is applied on the automobile window, there is a dead air space 11 between the glass plates which is effectively maintained.

I might say that my frost shield can be applied on a window without requiring the heating of the window, such as in winter time. In practice I can have the plates 5 cut to standard sizes and provided with the strips 6 thereon. In this form the frost shield can be sold to be later applied on the window. As the exposed face of the strip is non-tacky it does not require to be protected against other objects and a considerable saving is effected in the non-use of Holland cloth or such protective strip as is commonly done. When required for use it is only necessary to dampen the exposed face with gasoline and press tightly against the automobile window.

I have applied these shields in zero weather with the car in the open, and experienced no difficulty in doing the work and have found that the frost shield remains in place for an indefinite time and functions entirely satisfactorily.

In Figs. 5, 6 and 7 various shapes of frost shields are shown. Obviously my strips can be applied to glass plates of various shapes, and the plates can be cut to the shape of the window, so that a pleasing and neat job is effected in all cases.

In making the frost shields in quantities, it will be found desirable to provide a former for each type of window, the former being provided with a continuous channel following the contour of the window and having the depth of the channel slightly less than the thickness of the strip. With a former provided it is only necessary to put the strip, of predetermined length, in the channel, then wipe the exposed face of the strip with gasoline and finally apply the glass plate 5 against the exposed face of the strip and press it firmly down. When the plate is subsequently lifted, the strip will be found firmly adhered to the edge of the plate, as shown in the various figures of the drawing. As the strip is made of sponge rubber it is now an easy matter for one to press back the butted ends thereof and inject a cement therebetween to effectively close the joint. I have found that a board with a channel cut therein as described provides a very effective former.

I might here point out that the glass plates used will all be cut to the desired window shape, and should have their edges ground so that there is no possibility of them cutting anyone handling them. When the proper form is used for any selected glass plate, the strip will take its proper position, bordering the edge of the plate, providing the operator uses reasonable care when setting the plate over the strip in the channel.

I have found that when the present day automobile is equipped with frost shields of the type herein described, the window cannot be lowered for ventilating or other purposes, further than where the lower edge of the frost shield strikes the lower side of the window opening, and there is accordingly the possibility of damaging the frost shield. To avoid this I have placed a bumper 12 on the lower edge of the frost shield, the bumper being made from a short strip of sponge rubber stuck to the lower edge of the frost shield in the same manner as already described. With this bumper supplied the frost shield is effectively protected as will be readily apparent.

I have also found that where relatively large glass sheets require to be used to form the frost shields, it is desirable to reinforce the corners of the frost shield, by applying relatively short strips of sponge rubber at the corners. The location of such reinforcing strips is shown in dotted outline in Fig. 6 and they are indicated by the reference number 13.

What I claim as my invention is:—

1. The combination with a transparent glass plate having rounded corners, of a continuous, soft rubber, spacing element adhesively attached to one face of the plate and flexing to accommodate the corners of the plate, said element crossing the sides and ends of the plate and having its ends butting and having the exposed face of the element remote from the plate provided with a coating of normally non-adhesive material of a nature to be rendered adhesive by the wiping of the surface thereof with gasoline.

2. The combination with a transparent glass plate having rounded corners, of a single length spacing strip of sponge rubber adhesively attached to one face of the plate and flexing to accommodate the corners of the plate and crossing the ends and sides of the plate, and having its ends butting, and with the exposed face of the strip remote from the glass provided with a coating of normally non-adhesive material of a nature to be rendered adhesive by the wiping of the surface thereof with gasoline.

WILLIAM F. AUGER.